United States Patent [19]

Paolo et al.

[11] 4,348,452

[45] * Sep. 7, 1982

[54] PREFABRICATED SELF-SUPPORTING PANELS AND ITS MANUFACTURING PROCESS

[75] Inventors: Peccenini Paolo, Villagrappa; Romini Paolo, Ravenna, both of Italy

[73] Assignee: Pantec S.R.L., Forli, Italy

[*] Notice: The portion of the term of this patent subsequent to May 19, 1998, has been disclaimed.

[21] Appl. No.: 242,647

[22] Filed: Mar. 11, 1981

Related U.S. Application Data

[63] Continuation-in-part of Ser. No. 57,203, Jul. 13, 1979, Pat. No. 4,268,574.

[51] Int. Cl.³ .......................... B32B 5/18; B32B 5/22
[52] U.S. Cl. .................................. 428/312.6; 156/79; 428/312.8; 428/317.9; 428/447; 428/454
[58] Field of Search .................. 156/79, 921; 428/308, 428/309, 310, 315, 331, 921, 312.2, 312.6, 312.8, 317.9, 313.7, 447, 454

[56] References Cited

U.S. PATENT DOCUMENTS

| | | | |
|---|---|---|---|
| 3,742,110 | 6/1973 | Kjelland-Fosterud | 428/312.6 |
| 4,017,316 | 4/1977 | Renkey et al. | 428/921 |
| 4,041,199 | 8/1977 | Cartwright | 428/331 |
| 4,072,788 | 2/1978 | Herweg et al. | 428/317.9 |
| 4,086,382 | 4/1978 | Hites | 428/168 |
| 4,107,376 | 8/1978 | Ishikawa | 428/317.9 |
| 4,122,203 | 10/1978 | Stahl | 428/318.4 |
| 4,169,915 | 10/1979 | Heitmann | 428/317.9 |
| 4,193,829 | 3/1980 | Kourtides et al. | 428/402 |
| 4,255,482 | 3/1981 | Udagawa | 428/313.7 |
| 4,256,803 | 3/1981 | Savey et al. | 428/313.7 |
| 4,268,574 | 5/1981 | Peccenini et al. | 428/312.6 |

FOREIGN PATENT DOCUMENTS

| | | | |
|---|---|---|---|
| 48-32176 | 10/1973 | Japan | 428/331 |
| 54-08012 | 4/1979 | Japan | 428/331 |

*Primary Examiner*—William J. Van Balen
*Attorney, Agent, or Firm*—Bucknam and Archer

[57] ABSTRACT

Prefabricated self-supporting panels having two outer layers and at least one inner layer provided with a foamed mixture, wherein the inner layer comprises unsaturated polyester resins, a coupling agent of the organo-functional silane type and a granular filler formed with foamed clay which fills the whole cavity between the two outer layers and has an average diameter between 15 and 20 mm and a specific gravity of 0.35 Kg/dm³.

The process for the manufacture of these panels has also been described.

12 Claims, No Drawings

PREFABRICATED SELF-SUPPORTING PANELS AND ITS MANUFACTURING PROCESS

This application is a continuation-in-part of U.S. Ser. No. 057,203 filed July 13, 1979, now U.S. Pat. No. 4,268,574.

The panels according to the present invention are manufactured articles comprising three or more layers, wherein the outer layers made of any kind of material perform a protective and aesthetic function, while the inner layer(s) are for imparting thereto the basic properties characterizing the panel. In the panels hitherto used, the core, that is the intermediate layer(s), is generally provided from a foamed mixture. The formation of the outer layers is provided either by special agglomerate slabs of unsaturated polyester resins reinforced by glass fibers, or by slabs of other material, if necessary reinforced by known techniques, the materials for the manufacture of these layers being selected depending on the specific use of each type of panel.

Thus, due to the particular characteristics hereinafter described, the possibilities of use for panels of this type range from building to furnishings, from padding to lining, from formation of ceilings to that of actual supporting floors, in latter case the panels being previously completed with the trimming mantle.

It is the primary object of the present invention to provide a panel having improved mechanical characteristics and better resistance to fire.

The above specified object has been accomplished by providing a panel having two outer layers and at least one inner layer, said at least inner layer consisting of a foamed mixture comprising:

(a) a foamed unsaturated polyester resin (b) an organo-functional silane derivative in a proportion of 0.1 to 5 percent in weight of the unsaturated polyester resin (c) a granular filler formed of a foamed clay having an average diameter between 15 and 20 mm and a specific gravity of 0.35 Kg/dm$^3$ used in such a quantity as to fill the whole cavity between the two outer layers.

Also a process for manufacturing self-supporting panels has been provided consisting in placing two outer layers at a distance filling the gap therebetween with granular filler consisting of a foamed clay having an average diameter between 15 to 20 mm and a specific gravity of 0.35 Kg/dm$^3$ pouring over the granular filler an unsaturated polyester resin with the relative foaming agent using ascoupling agent to the granular filler at least an organo-functional silane in a proportion from 0.1 to 5 percent in weight with respect to the unsaturated polyester resin.

The coupling agent may be mixed with the unsaturated polyester resin or may be attached to the granular filler pretreating the same with a solution of organo-functional silane.

Due to the silicic nature of the filler involved, the organo-functional silanes are advantageously exploited to improve the mechanical characteristics of the compound.

The organo-functional silanes are ingredients which, when added to the unsaturated polyester resin in percentages from about 0.1 to 5.0%, provide an actual "chemical bridge" between the matrix of unsaturated polyester resin and the surface of the filler. Such an action occurs through a known mechanism, which is herein briefly described.

The general structure of an organo-functional silane is as follows:

X=functional group

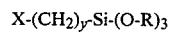

$y=3$

Organo functional silanes have a bipolar structure and the two poles show chemical reactivities of completely different type. Due to the presence of the hydrocarbon chain and functional group X, the organophilic pole can interact with polymer type materials, as those of many matrices. The hydrophilic pole of an organo-functional silane is provided with a so-called silicic reactivity, since the reactions are prevailingly affected by the presence of one atom of silicon.

With water, there will be a rapid development of a silantriolic compound, since the -(OR) group is of alkoxy type and shows a high tendency to hydrolysis, with formation of hydroxyl groups -(OH) directly bound to silicon.

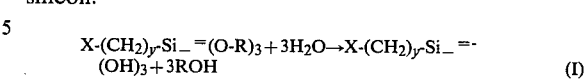  (I)

The silantriolic group can interact with the hydroxy groups present on the surface of oxides (for example, SiO$_2$, Al$_2$O$_3$, TiO$_2$, Fe$_2$O$_3$) or metals (such as Al, Fe).

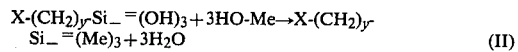  (II)

Me=Si, Al, Fe, Ti, etc.

The next stage involves the reaction of the functional group X and organic polymer, thus forming the "chemical bridge".

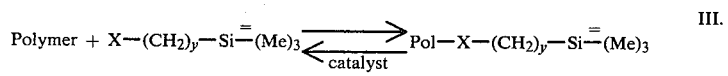  III.

It is required for the above reaction that the group X be chemically reactive with the organic polymer, with which it will be able to give rise to reactions of condensation or addition of the ionic or radical type.

Particularly suitable for use with unsaturated polyester resins are vinyl silanes and particularly methacryl silanes:

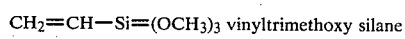 vinyltrimethoxy silane

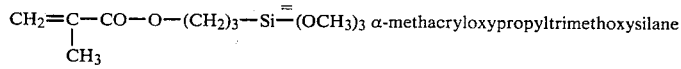 α-methacryloxypropyltrimethoxysilane the vinyl or methacril radical can copolyimerize by a radical addition reaction with the chain of unsaturated polyester.

Suitable resins among the unsaturated polyester resins have been found those based on hexachloro-endomethylene tetrahydrophalic anhydride (H.E.T. acid) and, where particular heat resistance properties up to 250° C. are required, resins containing trallylcycanurate as a monomer, which is a trifunctional product forming a very stable reticulated system when reacting with suitably designed polyester chains.

A foaming agent is added to the mixture of the unsaturated polyester resin and the organosilane prior to heating to permit foaming.

EXAMPLE

| Component I | |
|---|---|
| Unsaturated polyester resin | 100 pp |
| Water | 2–3.5 pp |
| 15% dimethylaniline | 0.5 pp |
| Siliconic stabilizer | 0.5 pp |
| Antimonium trioxide | 10 pp |
| Organo-functional silane | 0.5–5 pp |
| Component II | |
| Raw MDI | 30–50 pp |
| 50% benzoylperoxide | 1–4 pp |
| Component III | |
| Foamed clay in such quantities as to fill the whole volume between the two outer layers. | |

The gap between the outer layers is entirely filled with granules of foamed clay having an average granulometry of 20 mm and specific gravity of 350 kg/cu.m.. With the aid of a small fast mixer first component I is prepared and then component II. Then component I is rapidly mixed to component II. Now the preparation provided with good fluidity is poured on the foamed clay when the latter has been already placed in the gap between the two outer layers; the sufficient fluidity enables the liquid to pour through the interspaces between the granules to the die bottom; then the expansion reaction is started and the foam, still in the liquid state, reaches the top of the die, filling the whole free space available within the gap.

The total specific gravity of the intermediate layer results of about 500 Kg/cu.m.; the apparent thermal conductivity is 0.10 Kcal/hm°C. and class of resistance to fire: 120 minutes according to Italian praxis; (namely when a face is exposed to fire, the other face-if it has a 10 cm thickness-reaches 150° C. after 120 minutes).

The comparison is shown in the following Table.

TABLE

| Characteristics | Untreated | Treated with silane | unity of measure |
|---|---|---|---|
| Max.compressive stress | 15 | 25 | Kg/sq.cm. |
| Compressive modulus of elasticity | 1500 | 2500 | " |
| Max.bending stress | 5 | 10 | " |
| Flexural modulus of elasticity | 1200 | 2000 | " |

There is also an improvement in the dimensional stability of the foam: a specimen of 70×15×10 cm bearing on two knives at a spacing of 60 cm, subjected to bending under a constant central load of 50% max. bending stress (T=20° C.; U.R.=50%), shows after about $10^4$ hours a permanent deformation due to viscous sliding or creep of about 0.1 mm.

According to one embodiment which provides a saving of the organo-functional silanic agent, the granular filler is pretreated. An aqueous solution of the silane can be prepared at a concentration varying from 0.1 to 1.0%. This solution may be sprayed on the granular filler, or the filler can be immersed in the solution. Then, the granular filler is dried, and thus is ready for agglomeration with the binder based on foamed unsaturated polyester resin, but avoids the step of adding to the foaming mixture the silanic binder which is already present on the surface of the granular filler.

In any case, after selecting the type of outer layers externally characterizing the panel, these are positioned in the die which is made of "crystalline" plastic material (PP,PE), as a vertical extension of the die at a distance depending on the thickness of the finished panel.

Upon insertion of the granular filler, the pouring is carried out for the foaming mixture containing organo-functional binder comprising vinyl-silane or methacrylsilane in a percentage of 0.1 to 5.0%, the sandwich is closed with the second outer layer which will bear on the vertical extension of the frame of the die. The whole is then inserted in a press, dimensioned to contain the stresses developed by the expansion, and there maintained to complete reticulation of the foam. As to the type of press it should be stated that, even though particular expedients are not essential, for large industrial productions an air cushion press is particularly suitable.

Finally, it will be stated that the loaded mixture itself could be used also as filler for non-planar manufactured articles, such as fretted sheets or the like: the reason is that during expansion, the filling occupies all the zones of a gap either with constant or irregular section.

On its edge, the panel may be provided with a frame to promote its assembly and connection with other panels: such a frame is inserted as a spacing element between the slabs and in this case will determine the thickness of the finished panel. Preferably, the frame is made of iron or aluminum sheet, or plastic material or wood.

We claim:

1. A prefabricated self-supporting panel comprising two outer layers and at least one inner layer, said at least inner layer consisting of a foamed mixture consisting of:
(a) a foamed unsaturated polyester resin,
(b) an organo-functional silane derivative in a proportion of 0.1% to 5 percent,
(c) a granular filler formed of foamed clay having an average diameter between 15 and 20 mm and a specific gravity of 0.35 Kg/dm$^3$ in such a quantity as to fill the whole cavity between the two outer layers.

2. A panel according to claim 1 wherein the organo-functional silane derivative is vinylsilane.

3. A panel according to claim 1 wherein the organo-functional silane derivative is a methacrylsilane.

4. A panel according to claim 1 wherein the foamed clay has been pretreated with 0.1 to 1 percent of an organo-functional silane aqueous solution and then it has been dried.

5. A process for manufacturing self-supporting panels consisting of placing two outer layers at a distance, filling the gap there between with granular filler consisting of a foamed clay having an average diameter between 15 to 20 mm and a specific gravity of 0.35 Kg/dm$^3$, and pouring over the granular filler an unsaturated polyester resin with the relative foaming agent using as coupling agent to the granular filler at least an organo-functional silane in a proportion from 0.1 to 5 percent in weight with respect to the unsaturated polyester resin.

6. A process according to claim 5 wherein the coupling agent is mixed with the unsaturated polyester resin and the poured.

7. A process according to claim 5 wherein the organo-functional silane essentially consists of vinylsilane.

8. A process according to claim 5 wherein the organo-functional silane essentially consists of methalcrylsilane.

9. A process according to claim 5 wherein the granular filler is pre-treated with 0.1 to 1 percent aqueous solution of organo-functional silane aqueous solution, and then it is dried.

10. A process according to claim 5 wherein the foamed mixture for said intermediate layer is of such a type that, being independently expanded, it would reach a specific gravity not lower than 0.12 Kg/dm$^3$.

11. A process according to claim 5, wherein the unsaturated polyester resin is resistant to flame and to high temperature distorsion.

12. A process according to claim 10 wherein the unsaturated polyester resin contains hexachloro endomethylene tetrahydrophaliic anhydride.

* * * * *